(12) United States Patent
Beckmann et al.

(10) Patent No.: US 10,409,610 B2
(45) Date of Patent: Sep. 10, 2019

(54) METHOD AND APPARATUS FOR INTER-LANE THREAD MIGRATION

(71) Applicant: Advanced Micro Devices, Inc., Sunnyvale, CA (US)

(72) Inventors: Bradford Beckmann, Bellevue, WA (US); Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 456 days.

(21) Appl. No.: 15/010,093

(22) Filed: Jan. 29, 2016

(65) Prior Publication Data

US 2017/0220346 A1 Aug. 3, 2017

(51) Int. Cl.
*G06F 9/38* (2018.01)
*G06F 9/48* (2006.01)

(52) U.S. Cl.
CPC .......... *G06F 9/3851* (2013.01); *G06F 9/3887* (2013.01); *G06F 9/4856* (2013.01)

(58) Field of Classification Search
CPC .. G06F 9/3009; G06F 9/30098; G06F 9/3851; G06F 9/3887
See application file for complete search history.

(56) References Cited

U.S. PATENT DOCUMENTS

| | | | | |
|---|---|---|---|---|
| 8,766,996 B2 * | 7/2014 | Du | ........................ | G06F 9/3012 345/530 |
| 2015/0095914 A1 * | 4/2015 | Mei | ....................... | G06F 9/4843 718/102 |

OTHER PUBLICATIONS

Vaidya et al., "SIMD Divergence Optimization through Intra-Warp Compaction", 2013, ACM.*
Rhu and Erez, "Maximizing SIMD Resource Utilization in GPGPUs with SIMD Lane Permutation", 2013, ACM.*
Fung et al., "Dynamic Warp Formation: Efficient MIMD Control Flow on SIMD Graphics Hardware", Jun. 2009, ACM.*

* cited by examiner

*Primary Examiner* — Benjamin P Geib
(74) *Attorney, Agent, or Firm* — Faegre Baker Daniels LLP

(57) ABSTRACT

Briefly, methods and apparatus to migrate a software thread from one wavefront executing on one execution unit to another wavefront executing on another execution unit whereby both execution units are associated with a compute unit of a processing device such as, for example, a GPU. The methods and apparatus may execute compiled dynamic thread migration swizzle buffer instructions that when executed allow access to a dynamic thread migration swizzle buffer that allows for the migration of register context information when migrating software threads. The register context information may be located in one or more locations of a register file prior to storing the register context information into the dynamic thread migration swizzle buffer. The method and apparatus may also return the register context information from the dynamic thread migration swizzle buffer to one or more different register file locations of the register file.

20 Claims, 9 Drawing Sheets

```
@BB0_6:
  barrier;
  and_b32 $s3, $s0, 15;
  cmp_ne_b1_u32 $c0, $s3, 0;
  sb_st $s0, $s1; //store s0, s1 regs to swizzle buffer
  sb_ldst $s0, $s1, $s2,$s3; //load s0, s1 to register file
                             // store s2,s3 to swizzle buffer
  sb_ld $s2,$s3; //load s2,s3 back to register file
  cbr  $s0, @BB0_8;  ⟶ MicroKernel boundary
//%if.end.2
```

$c ⟶ conditional registers
$s ⟶ Registers storing single precision values

METHOD AND APPARATUS FOR INTER-LANE THREAD MIGRATION

OTHER PARTY INTERESTS

This invention was made with Government support under Prime Contract Number DE-AC52-07NA27344, Subcontract Number B600716, awarded by the DOE. The Government has certain rights in this invention.

BACKGROUND OF THE DISCLOSURE

The disclosure relates generally to methods and apparatus to migrate a software thread from one execution unit (e.g. single instruction multiple data (SIMD) lane) to another execution unit within, for example, a compute unit (e.g. SIMD unit). Processing devices, such as Graphic Processing Units (GPUs), include one or more compute units that may each be composed of one or more execution units. Traditionally, software threads executing on a GPU are associated with a particular execution unit such that the software thread executes on that particular execution unit for its lifetime (e.g. until the software thread completes executing). A collection of software threads that execute on the same execution unit in lockstep are known as a wavefront, whereby one or more wavefronts may be associated with an execution unit. However, various issues may present themselves when wavefronts remain executing on the same execution unit for the lives of the corresponding software threads.

For example, wavefronts encounter the issue of branch divergence when software threads associated with the same wavefront must execute different paths of a software branch (e.g. a conditional branch instruction or an if/else condition). Because the software threads associated with a same wavefront execute in lockstep on the same execution unit, the execution unit must execute both paths of the software branch as required by the various software threads associated with the wavefront. As such, when the execution unit executes one path, the software threads requiring the alternate path to be executed are held idle (e.g. need to wait until the first path is executed). Likewise, when the execution unit executes the alternate path, the software threads that required the first path are held idle. Not until both paths are processed does the execution unit begin re-executing all of the software threads associated with the same wavefront. In such a situation, the overall processing power of the processing device is not fully utilized, as software threads are sitting idle rather than being executed.

A similar issue arises when wavefronts encounter the issue of memory latency divergence. Memory latency divergence arises when software threads associated with the same wavefront execute memory operations that may take longer than others. For example, while there may be one or more software threads associated with a wavefront that take less time to execute memory operations (e.g. reads or writes to cache memory), there may be one or more other software threads associated with the same wavefront that may take more time to execute memory operations (e.g. reads or writes to main memory). In this situation, because the software threads associated with the same wavefront execute in lockstep, the software threads that execute memory operations that take less time to execute must wait until the software threads that execute memory operations that take more time to execute to complete before all software threads may start again to execute together in lockstep. As with the issue of branch diversion, memory latency divergence causes inefficiencies in the execution of software threads, thus reducing the overall processing power of a processing device.

To address the aforementioned problems caused by branch divergence and memory latency divergence (as well as other issues as recognized by persons skilled in the art), current proposals provide for dynamic wavefront creation, allowing a software thread to migrate from one execution unit to another. In this fashion, software threads following similar software paths, or accessing similar memory such that memory access times are similar, are grouped together to create a new wavefront that will execute on a particular execution unit. In so doing, register context information (e.g. register data residing in a register file) associated with migrating threads must be migrated along with the software thread to maintain the integrity of the software thread's associated register data. However, these current solutions are limited in their ability to solve the aforementioned problems. For example, with lane aware dynamic wavefront creation, a software thread may migrate only to a SIMD lane that accesses a same register column in the register file. As such, this restriction limits the efficiency of dynamic wavefront creation in mitigating branch diversion. Other solutions include changing a register file structure when migrating a software thread from one execution unit to another. However, these solutions are less optimal for larger register file sizes, as they include changing the register file structure. Therefore, a need exists to improve dynamic wavefront creation solutions that allow for the migration of software threads.

BRIEF DESCRIPTION OF THE DRAWINGS

The embodiments will be more readily understood in view of the following description when accompanied by the below figures and wherein like reference numerals represent like elements, wherein:

FIG. 3 is a software listing that includes example dynamic thread migration swizzle buffer instructions;

DETAILED DESCRIPTION OF THE PREFERRED EMBODIMENTS

Figure 1:
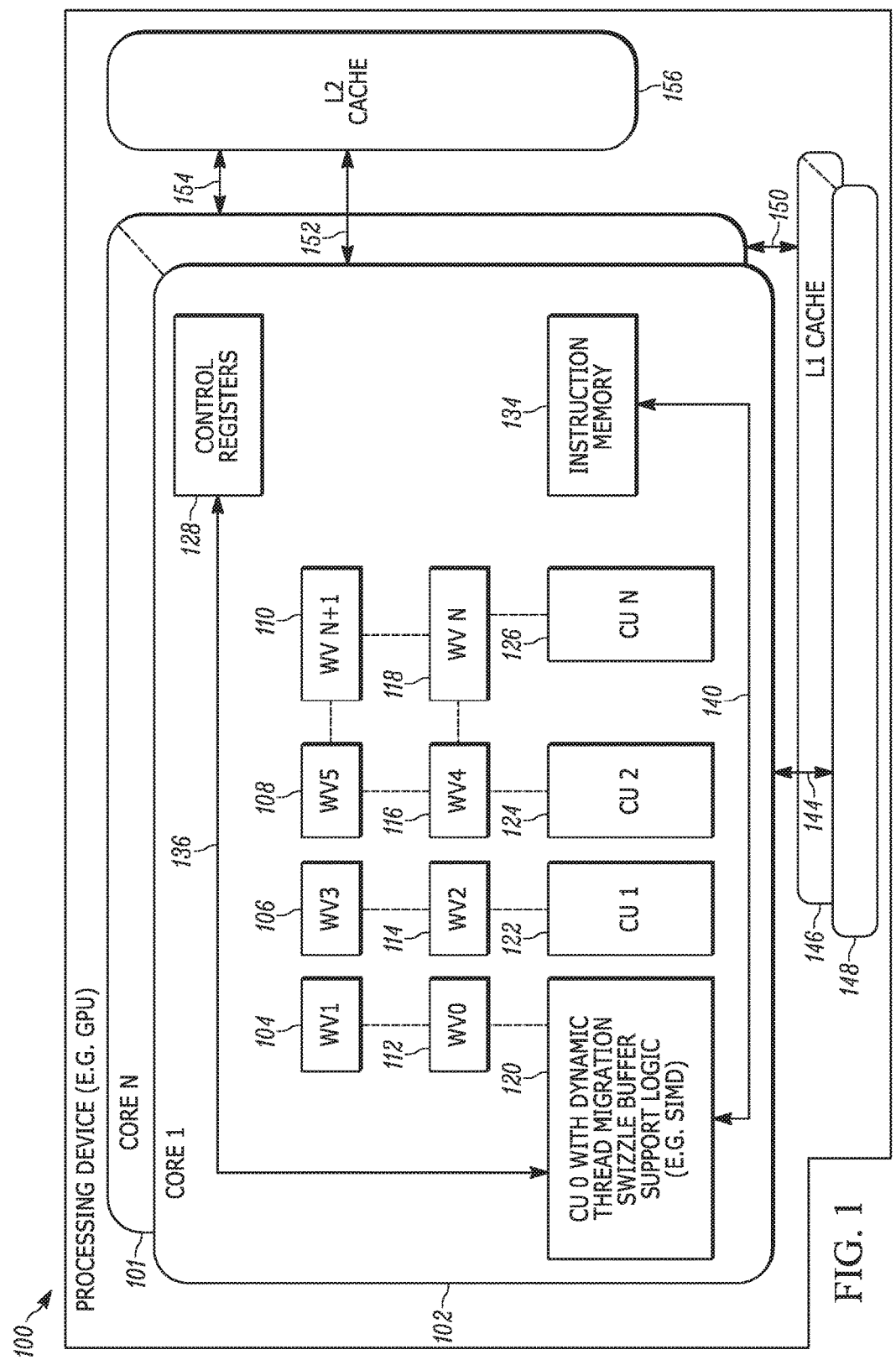
FIG. 1 is a functional block diagram illustrating an example processing device, such as a GPU, that includes multiple cores that include a dynamic thread migration swizzle buffer and one or more compute units that include dynamic thread migration swizzle buffer support logic to allow for the migration of software threads.

Briefly, methods and apparatus to migrate a software thread from one wavefront executing on one execution unit to another wavefront executing on another execution unit whereby both execution units are associated with a compute unit of a processing device such as, for example, a GPU. The methods and apparatus may execute compiled dynamic thread migration swizzle buffer instructions that when executed allow access to a dynamic thread migration swizzle buffer to provide for the migration of register context information when migrating software threads. In one example, the methods and apparatus provide for the migration of a software thread from a first wavefront executing on a first execution unit to a second wavefront executing on a second execution unit by storing register context information associated with the migrating software thread into a dynamic thread migration swizzle buffer. The register context information may be located in one or more locations of a register file (e.g. one or more register file locations of the register file) prior to storing the register context information into the dynamic thread migration swizzle buffer. The method and apparatus may also return the register context information from the dynamic thread migration swizzle buffer to one or more different register file locations of the register file.

For example, the register file may store register context information for software threads executing on different execution units within a compute unit of a processing device. One software thread may belong to one wavefront executing on one execution unit, and a second software thread may belong to wavefront executing on another execution unit. By utilizing the dynamic thread migration swizzle buffer to store register context information for each of the two software threads, the second software thread may be migrated to the wavefront executing on the first execution unit, and the first software thread may be migrated to the wavefront executing on the second execution unit.

For example, in one embodiment, the method and apparatus store register context information associated with a first software thread to a first location of a dynamic thread migration swizzle buffer, and store register context information associated with a second software thread to a second location of the dynamic thread migration swizzle buffer. The method and apparatus may also return register context information to a register file by loading (e.g. reading) the contents from the first location of the dynamic thread migration swizzle buffer and providing them to, for example, a first register column of the register file. Similarly, the method and apparatus may return register context information to the register file by loading the contents from the second location of the dynamic thread migration swizzle buffer swizzle buffer and providing them to a second register column of the register file. As such, the methods and apparatus allow register context information for migrating software threads to migrate from one column of a register file to another column of a register file, thus allowing for the migration of software threads from one execution unit (e.g. a SIMD lane) to another execution unit (e.g. a different SIMD lane).

In one embodiment, the storing of register context information into a dynamic thread migration swizzle buffer is in response to a processing device, such as a GPU, executing a dynamic thread migration swizzle buffer store instruction. For example, a compute unit within the processing device may execute a dynamic thread migration swizzle buffer store instruction causing register context information associated with a wavefront to be stored in the dynamic thread migration swizzle buffer. The dynamic thread migration swizzle buffer store instruction may be inserted into compiled software code that includes executable instructions that may be executed by the processing device.

In one embodiment, the returning of the register context information from a dynamic thread migration swizzle buffer is in response to a processing device executing a dynamic thread migration swizzle buffer load instruction. For example, a compute unit within the processing device may execute a dynamic thread migration swizzle buffer load instruction causing register context information associated with a wavefront to be read out of the dynamic thread migration swizzle buffer. The dynamic thread migration swizzle buffer load instruction may be inserted into compiled software code that includes executable instructions that may be executed by the processing device.

In one embodiment, the storing of register context information into a dynamic thread migration swizzle buffer and loading of contents from the dynamic thread migration swizzle buffer are performed simultaneously and in response to executing a dynamic thread migration swizzle buffer load-store instruction. For example, the dynamic thread migration swizzle buffer load-store instruction, when executed, allows for the simultaneous reading of one row of the dynamic thread migration swizzle buffer and writing of another row of the dynamic thread migration swizzle buffer. The dynamic thread migration swizzle buffer load-store instruction may be inserted into compiled software code that includes executable instructions that may be executed by the processing device.

In embodiment, one or more of the dynamic thread migration swizzle buffer store instruction, the dynamic thread migration swizzle buffer load instruction, and the dynamic thread migration swizzle buffer load-store instruction may be inserted at a branch or reconvergence point of the compiled software code. For example, one or more of the dynamic thread migration swizzle buffer store instruction, the dynamic thread migration swizzle buffer load instruction, and the dynamic thread migration swizzle buffer load-store instruction may be inserted at a branch or reconvergence point of compiled software code such that register context information is maintained for live registers (e.g. registers that may still be utilized by a software thread), but not for dead registers (e.g. registers that will not be used again by a software thread).

In one embodiment, the method and apparatus determine whether to migrate a software thread from a first wavefront executing on a first execution unit to a second wavefront executing on a second execution unit based on software thread migration information. Software thread migration information may be added to a reconvergence stack to specify a wavefront and an execution unit for a software thread to migrate to. For example, as defined in U.S. patent application Ser. No. 14/682,971 and incorporated herein by reference, a processor may include a compaction table, a reconvergence stack for each wavefront, and a reconvergence table. The compaction table is configured to store compaction point information, wherein the compaction point is a branch instruction. Each reconvergence stack is configured to store compaction point information for the corresponding wavefront. The reconvergence table is configured to store reconvergence point information, wherein the reconvergence point is a beginning of a program code segment to be executed by both a taken branch and a not taken branch from a previous branch instruction. While such a reconvergence stack may maintain reconvergence information needed for proper software thread migration, the addition of software thread migration information to the reconvergence stack allows for the specifying of a destination wavefront and execution unit for a migrating software thread.

In one embodiment, the method and apparatus determine a number of partitions for the dynamic thread migration swizzle buffer based on a number of software threads in a wavefront, and a number of wavefronts. For example, the number of software threads in a wavefront may be a maximum number of software threads supported in a wavefront, or may be any other suitable number of software threads. The number of wavefronts may also be any suitable number of wavefronts, such as the maximum number of wavefronts supported by a compute unit of a processing device. The method and apparatus may partition the dynamic thread migration swizzle buffer into one or more partitions, such as a first partition and a second partition, based on the determined number of partitions. For example, the dynamic thread migration swizzle buffer may be partitioned into a number of partitions equal to a maximum number of software threads supported in a wavefront multiplied by a maximum number of wavefronts supported by a compute unit of a processing device. In this example, each possible software thread on every possible wavefront within a compute unit will have (e.g. be assigned) a corresponding partition in the dynamic thread migration swizzle buffer. For example, the method and apparatus may associate a first partition of the dynamic thread migration swizzle buffer with a first wavefront and associate a second partition of the dynamic thread migration swizzle buffer with a second wavefront.

Among other advantages, the methods and apparatus allow for the migration of register context information from one column of a register file to another column of a register file, thus allowing the migration of software threads from one execution unit to another execution unit (e.g. from one SIMD lane to another SIMD lane). The methods and apparatus also allow for the migration of register context information without hardware modifications to a register file. In addition, hardware and processing overhead associated with migrating register context information may be reduced. Furthermore, memory resources that may be required to allow for the migration of register context information in current solutions may also be reduced, as the size of the dynamic thread migration swizzle buffer is independent of the number of registers supported by a register file. Persons of ordinary skill in the art would recognize and appreciate further advantages as well.

Turning now to the drawings, and as described in detail below, one example of the presently disclosed system, as shown in FIG. 1, is a processing device 100, such as a GPU, with multiple processing cores that execute software threads. In some embodiments, processing device 100 may be an accelerated processing unit (APU), a central processing unit (CPU), a field programmable gate array (FPGA), an application-specific integrated circuit (ASIC), or any other suitable instruction processing device with multiple cores. In some embodiments, some or all of the functions of processing device 100 may be performed by any suitable processor or processors that may, for example, execute a software driver, firmware, or any other suitable executable code stored in memory. As shown, processing device 100 includes processing core 1 102 and processing core N 101. As recognized by those of ordinary skill in the art, the number of processing cores is variable. For example, the processing device 100 may include 16, 32, or any suitable number of processing cores. In addition, each processing core 101, 102 may include one or more compute units. For example, processing core 102 is shown with compute unit 0 120, compute unit 1 122, compute unit 2 124, and compute unit N 126, each with dynamic thread migration swizzle buffer support logic, described in further detail below. The compute units may be, for example, SIMD units. Wavefronts associated with (e.g. executing on) each compute unit are also shown. For example, wavefront 0 112 and wavefront 1 104 are shown to be associated with compute unit 0 120. Likewise, wavefront 2 114 and wavefront 3 106 are shown to be associated with compute unit 1 122. Wavefront 4 116 and wavefront 5 108 are shown to be associated with compute unit 2 124, and wavefront N 118 and wavefront N+1 110 are shown to be associated with compute unit N 126. Although two wavefronts are shown to be associated with each compute unit, it is to be appreciated that any suitable number of waverfronts may be associated with each compute unit. For example, one compute unit may be associated with more wavefronts than another compute unit.

Each wavefront may include one or more software threads that execute on the corresponding compute unit. For example, software threads included in wavefront 0 112 execute on compute unit 0 120. Although the software threads themselves are not shown in FIG. 1, it is to be appreciated that each wavefront may include one or more software threads that execute on the corresponding compute unit. Executable software thread instructions may be stored in instruction memory 134 whereby the compute units are operable to obtain (e.g. read) the executable software thread instructions for software thread execution. For example, compute unit 0 120 may access instruction memory 134 over communication link 140. Although not shown for simplicity reasons, compute unit 1 122, compute unit 2 124, and compute unit N 126 may access instruction memory 134 or any other suitable memory over communication links as well to allow for the execution of software thread instructions. Communication link 140 may be any suitable communication link that allows access to software instructions stored in instruction memory 134. For example, communication link 140 may include logic providing read access to instruction memory 134.

Compute unit 0 also has access to control registers 128 over communication link 136. The control registers 128 may include registers that hold wavefront configuration information, such as information indicating how many software threads a wavefront may include, or a maximum number of wavefronts per compute unit. Although not shown for simplicity reasons, compute unit 1 122, compute unit 2 124, and compute unit N 126 may also have access to control registers 128.

The processing device 100 also includes L1 cache memory 148, 146 and L2 cache memory 156. Although L1 cache memory 148, 146 and L2 cache memory 156 are shown as on-chip memory, it is appreciated that they may be any suitable memory, whether on-chip or off-chip. Processing core 1 102 has access to L1 cache memory 148 over communication link 144, and processing core N 104 has access to L1 cache memory 146 over communication link 150, as known in the art. As such, software threads executing on processing core 1 102 may read or write to L1 cache memory 148 over communication link 144, but they do not have access to L1 cache memory 146. Similarly, while software threads executing on processing core N 101 may read or write to L1 cache memory 146 over communication link 150, they do not have access to L1 cache memory 148. L2 cache memory 156, however, is accessible to software threads executing on both processor core 1 102 and processor core N 101. For example, software threads executing on processing core 1 102 may access L2 cache memory 156 via communication link 152, and software threads executing on processing core 2 101 may access L2 cache memory 156 via communication link 154.

Figure 2:
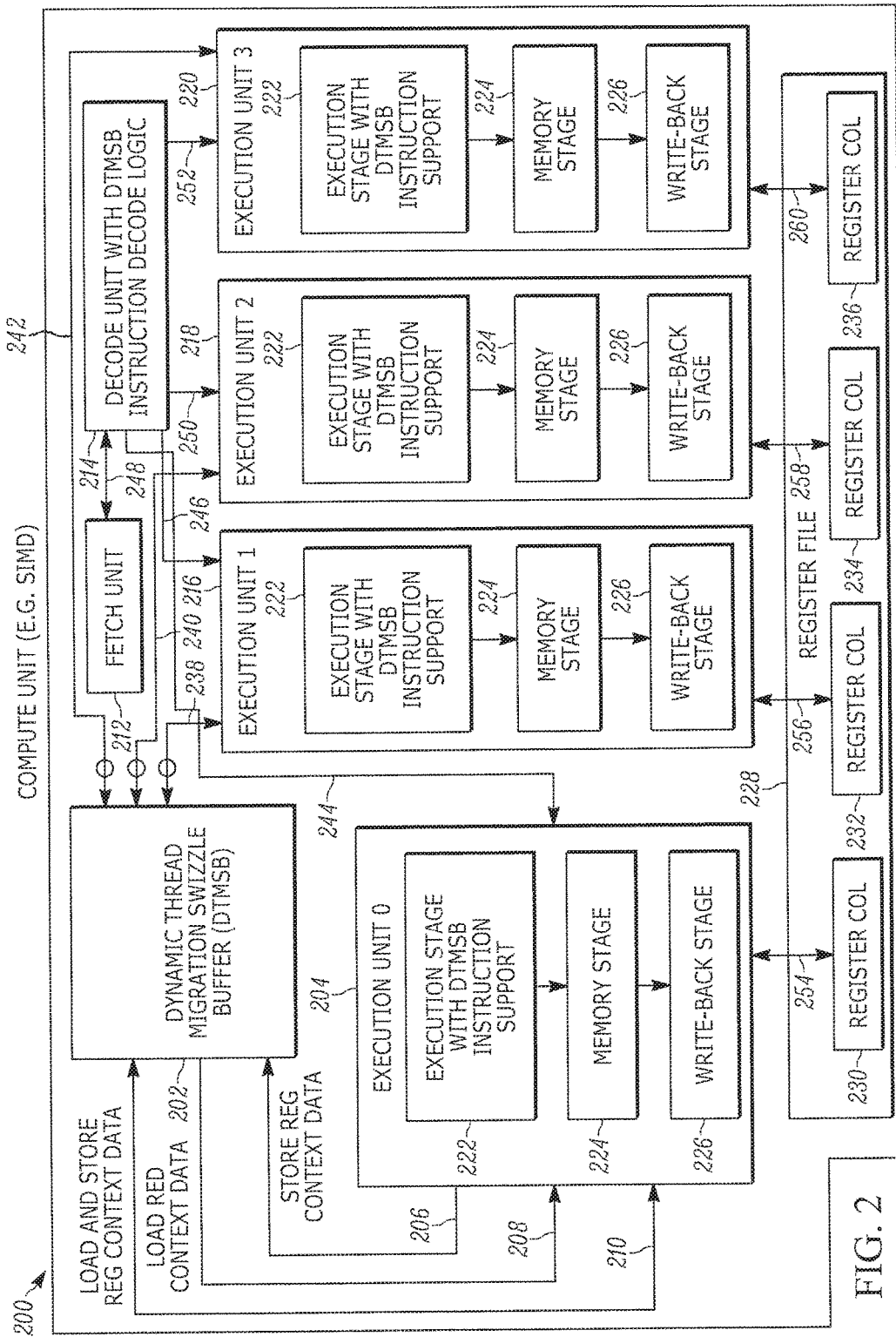
FIG. 2 is a functional block diagram of the example compute unit with dynamic thread migration swizzle buffer support logic of FIG. 1.

FIG. 2 is a functional block diagram of an example compute unit 200, such as compute unit 0 120, compute unit 1 122, compute unit 2 124, or compute unit N 126 of FIG. 1. As indicated in the figure, compute unit 200 includes execution unit 0 204, execution unit 1 216, execution unit 2 218, and execution unit 3 220. In one example, compute unit 200 is a SIMD unit whereby execution unit 0 204, execution unit 1 216, execution unit 2 218, and execution unit 3 220 each represent a SIMD lane. Compute unit 200 also includes a dynamic thread migration swizzle buffer (DTMSB) 202 which may allow for the storage of register context information and whose operation is described in further detail below. The dynamic thread migration swizzle buffer 202 may be, for example, any suitable memory logic (e.g. memory device), including, for example, a register cache memory. Although the dynamic thread migration swizzle buffer 202, as shown in FIG. 2, appears within compute unit 200, it is appreciated that the dynamic thread migration swizzle buffer 202 may be external to the compute unit such that it is accessible and common to multiple compute units. For example, rather than having one dynamic thread migration swizzle buffer 202 per compute unit, there would be one dynamic thread migration swizzle buffer 202 per processing core, such that the dynamic thread migration swizzle buffer 202 would serve all compute units within a processing core in a manner similar to that described below.

The dynamic thread migration swizzle buffer 202 may be configured into partitions, such that there is one partition per wavefront. For example, the maximum number of supported wavefronts may determine the number of partitions within the dynamic thread migration swizzle buffer 202. To allow for simultaneous read and write operations, as described further below, each partition of the dynamic thread migration swizzle buffer 202 may include two rows, such that one is a read row and the other is a write row. For example, while one row of a partition is being read, another row of the same or a different partition may be written to. In addition, in some embodiments each column of the dynamic thread migration swizzle buffer 202 may be associated with an execution unit, such as a SIMD lane. For example, each partition may include two rows, and a number of columns corresponding to the number of execution units within a compute unit. Further descriptions of the dynamic thread migration swizzle buffer 202 appear below.

Execution unit 0 204 may load (e.g. read) data from, and store (e.g. write) data to, the dynamic thread migration swizzle buffer 202. For example, execution unit 0 204 may load register context information from the dynamic thread migration swizzle buffer 202 over communication link 208. Similarly, execution unit 0 204 may store register context information to the dynamic thread migration swizzle buffer 202 over communication link 206. Execution unit 0 may also execute a simultaneous load and store operation over communication link 210, such that data is loaded from the dynamic thread migration swizzle buffer 202 at the same time (e.g. during the same compute unit clock cycles) that data is stored to the dynamic thread migration swizzle buffer 202. For example, execution unit 0 204 may simultaneously load register context information from and store register context information to the dynamic thread migration swizzle buffer 202. These operations may be performed in response to the execution of various software instructions, as described in further detail below. In addition, although communication links 206, 208, and 210 are shown as separate communication links, it is to be appreciated that the operations described above may be performed over the same communication link. For example, communication link 208 may allow for the load, store, and the simultaneous load and store operations described above. Similarly, execution unit 1 216, execution unit 2 218, and execution unit 3 220 may also have access to dynamic thread migration swizzle buffer 202. Although individual communication links 238, 240, 242 are shown to each of these execution units for simplicity purposes, it is to be appreciated that communication links 238, 240, and 242 allow for at least the same access to the dynamic thread migration swizzle buffer 202 as described above with respect to execution unit 0 204.

Compute unit 200 also includes register file 228, whereby register file 228 may store register context information as known in the art. Each execution unit may have access to register file 228. However, execution units may have access to only a column of the register file 228. For example, execution unit 0 204 may read from or write to register file 228 over communication link 254. However, execution unit 0 may only have access to a particular register column, such as register column 230, of register file 228. Similarly, execution unit 1 216 may read from or write to register column 232 over communication link 256; execution unit 2 218 may read from or write to register column 234 over communication link 258; and execution unit 3 216 may read from or write to register column 236 over communication link 260.

Compute unit 200 also includes fetch unit 212, which as known in the art may fetch instructions to be executed by the execution units. For example, a fetched instruction may, after decoding (described below), be executed in lockstep by one or more of execution unit 0 204, execution unit 1 216, execution unit 2 218, and execution unit 3 220. A fetched instruction is then provided over communication link 246 to be decoded by decode unit with DTMSB instruction decode logic 214. In addition to decoding various other instructions as known in the art, decode unit with DTMSB instruction decode logic 214 includes decode logic to decode instructions that allow access to the dynamic thread migration swizzle buffer 202. Specifically, decode unit with DTMSB instruction decode logic 214 allows for the decoding of a dynamic thread migration swizzle buffer load instruction, a dynamic thread migration swizzle buffer store instruction, and a dynamic thread migration swizzle buffer load-store instruction. Decoded instructions, such as a decoded dynamic thread migration swizzle buffer load instruction, a decoded dynamic thread migration swizzle buffer store instruction, or a decoded dynamic thread migration swizzle buffer load-store instruction, may then be provided to the execution units. For example, decoded instructions may be provided to execution unit 0 204 over communication link 244. Similarly, decoded instructions may be provided to execution unit 1 216 over communication link 246, to execution unit 2 218 over communication link 250, and to execution unit 3 220 over communication link 252.

As shown, execution unit 0 204 includes an execution stage with DTMSB instruction support 222. As known in the art, an execution stage allows for the execution of known decoded instructions. However, execution stage with DTMSB instruction support 222 further allows for the execution of a decoded dynamic thread migration swizzle buffer load instruction, a decoded dynamic thread migration swizzle buffer store instruction, or a decoded dynamic thread migration swizzle buffer load-store instruction. For example, execution stage with DTMSB instruction support 222 may execute a decoded dynamic thread migration swizzle buffer load instruction, causing register context information associated with a wavefront to be read out of the dynamic thread migration swizzle buffer 202 and stored in register column 230 of register file 228. Similarly, execution stage with DTMSB instruction support 222 may execute a decoded dynamic thread migration swizzle buffer store instruction, causing register context information associated with a wavefront to be read from register column 230 of register file 228 and stored in the dynamic thread migration swizzle buffer 202. Execution stage with DTMSB instruction support 222 may also execute a decoded dynamic thread migration swizzle buffer load-store instruction, causing two simultaneous operations. For example, register context information associated with a wavefront may be read out of the dynamic thread migration swizzle buffer 202 and stored in register file 228, while at the same time register context information associated with a different wavefront may be read from register file 228 and stored in the dynamic thread migration swizzle buffer 202.

Execution unit 0 also includes memory stage 224 and write-back stage 226 as known in the art. For example, during the memory stage 224, data stored in memory may be accessed. During the write-back stage, however, the register file 228 may be written to. In addition, although not shown, execution unit 0 may include other stages or logic as known in the art. As indicated in FIG. 2, execution unit 1 216, execution unit 2 218, and execution unit 3 220 may also include an execution stage with DTMSB instruction support 222, a memory stage 224, and a write-back stage 226.

FIG. 3 is a software listing that includes example dynamic thread migration swizzle buffer instructions, such as the dynamic thread migration swizzle buffer load instruction, the dynamic thread migration swizzle buffer store instruction, and the dynamic thread migration swizzle buffer load-store instruction, described above and further below. The example dynamic thread migration swizzle buffer instructions are shown just above a branch instruction, indicated as "cbr" in FIG. 3. For example, the dynamic thread migration swizzle buffer store instruction is shown as "sb_st" in the figure. In one example, executing this instruction may allow for the storage of register content found in two 4 byte registers (single precision registers) or one 8 byte register (double precision register), for example, from register file 228, into the dynamic thread migration swizzle buffer 202. The address in the dynamic thread migration swizzle buffer 202 to which register content should be stored may be defined by software thread migration information that may be found, for example, in a reconvergence stack as described above. This instruction may result, for example, in two reads to the register file 228 and two writes to the dynamic thread migration swizzle buffer 202. As shown in the figure, the "sb_st" instruction stores the contents of single precision registers s0 and s1 to, for example, the dynamic thread migration swizzle buffer 202.

The dynamic thread migration swizzle buffer load instruction is shown as "sb_ld" in the figure. In one example, execution of the "sb_ld" instruction loads two 4 byte registers (single precision registers) or one 8 byte register (double precision register) from the dynamic thread migration swizzle buffer 202 to register file 228. The address in the dynamic thread migration swizzle buffer 202 to which register content should be stored may be defined by software thread migration information. This instruction may result, for example, in two reads from the dynamic thread migration swizzle buffer 202 and two writes to the register file 228. As shown in the figure, the "sb_ld" instruction loads single precision registers s2 and s3 with contents from, for example, the dynamic thread migration swizzle buffer 202.

The dynamic thread migration swizzle buffer load-store instruction is shown as "sb_ldst" in the figure. In one example, the instruction may be a compound instruction formed by combining the "sb_ld" and "sb_st" instructions whereby the "sb_ld" instruction takes the first two operands in the case of single precision registers (only the first operand in case of double precision registers) and the "sb_st" instruction takes the last two operands (only the last operand in the double precision variant). Execution of the "sb_ldst" instruction may load two 4 byte registers (single precision registers) or one 8 byte register (double precision register) from, for example, the dynamic thread migration swizzle buffer 202 to register file 228. Simultaneously, execution of the "sb_ldst" instruction may also store two 4 byte registers (single precision registers) or one 8 byte register (double precision register) into the dynamic thread migration swizzle buffer 202. The address in the dynamic thread migration swizzle buffer 202 to which register content is either stored to or loaded from may be defined by software thread migration information. This instruction may result, for example, in two reads and two writes to both the dynamic thread migration swizzle buffer 202 and to register file 228. As indicated below with respect to FIG. 8, the "sb_st," "sb_ldst," and "sb_ld" instructions may be inserted by a compiler with dynamic thread migration swizzle buffer instruction support.

In some embodiments, once wavefronts waiting at a compaction point start executing dynamic thread migration swizzle buffer instructions to migrate a software thread, the wavefronts gain an exclusive right to access the dynamic thread migration swizzle buffer, such as dynamic thread migration swizzle buffer 202, and retain the exclusive right until the software thread migration is over. Because multiple wavefronts may need to access the dynamic thread migration swizzle buffer to migrate software threads, contentions for the dynamic thread migration swizzle buffer may occur among wavefronts. Thus, it is desirable to complete the software thread migration in the shortest amount of time possible so that a dynamic thread migration swizzle buffer can be reused by other wavefronts waiting at a compaction or reconvergence point. For achieving this, the wavefronts that are participating in the software thread migration may be given a higher execution priority than other wavefronts. In some embodiments, dynamic thread migration swizzle buffer instructions are scheduled in back-to-back cycles (e.g. clock cycles) for faster execution, resulting in a quicker release of the dynamic thread migration swizzle buffer. In some embodiments, multiple dynamic thread migration swizzle buffers may be incorporated such as to alleviate the dynamic thread migration swizzle buffer contentions among wavefronts described above.

Figure 4:
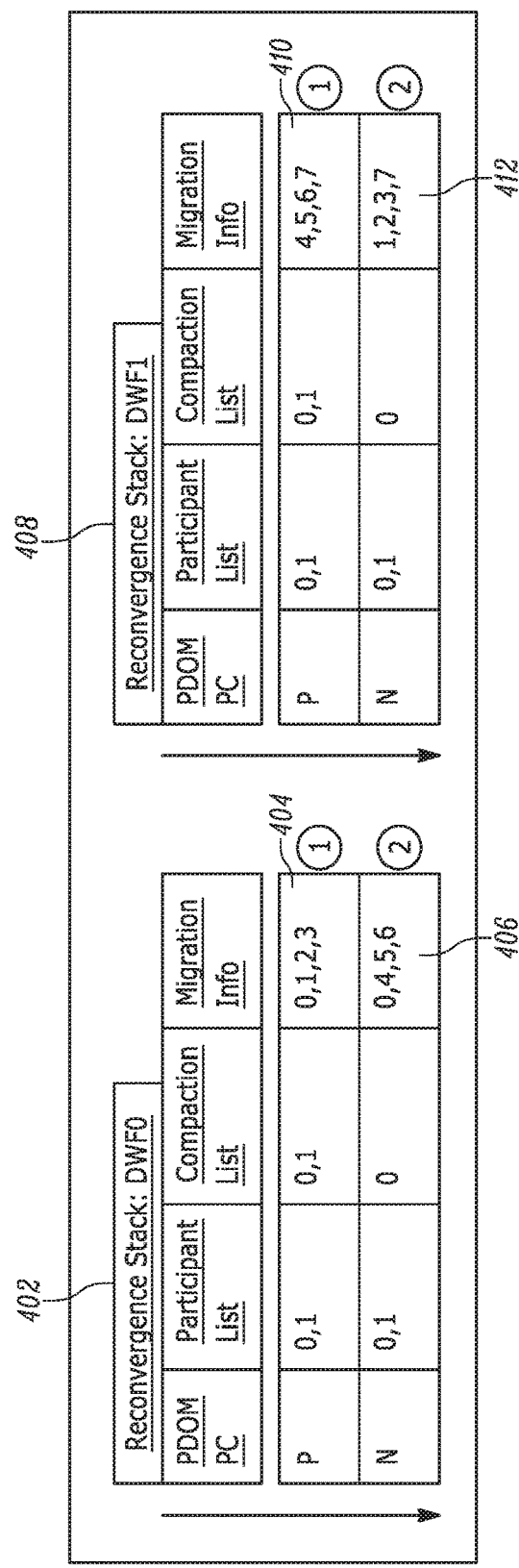
FIG. 4 includes diagrams of a reconvergence stack that includes software thread migration information.

Turning to FIG. 4, diagrams of a reconvergence stack that includes an added column for software thread migration information is shown. For example, as indicated by the first entry 404 in the reconvergence stack for dynamic wavefront 0 (DWF0) 402, software threads with software thread IDs 0, 1, 2, and 3 are residing in lanes (e.g. SIMD lanes) 0, 1, 2, and 3, respectively, of dynamic wavefront 0. Similarly, as indicated by the first entry 410 in the reconvergence stack for dynamic wavefront 1 (DWF1) 408, software threads with software thread IDs 4, 5, 6, and 7 are residing in lanes 0, 1, 2, and 3, respectively, of dynamic wavefront 1. The second entry 406 in the reconvergence stack for dynamic wavefront 0 (DWF0) 402 indicates that software threads associated with software thread IDs 1, 2, and 3 are to be migrated from lanes 1, 2, and 3 of dynamic wavefront 0 to lanes 2, 3, and 4, respectively, of dynamic wavefront 1. The second entry 412 in the reconvergence stack for dynamic wavefront 1 (DWF1) 408 indicates that software threads associated with software thread IDs 4, 5, and 6 are to be migrated from lanes 0, 1, and 2, respectively, of dynamic wavefront 1 to lanes 1, 2, and 3, respectively, of dynamic wavefront 0. The software thread migration may take place at a compaction point, as described above.

Figure 5A:
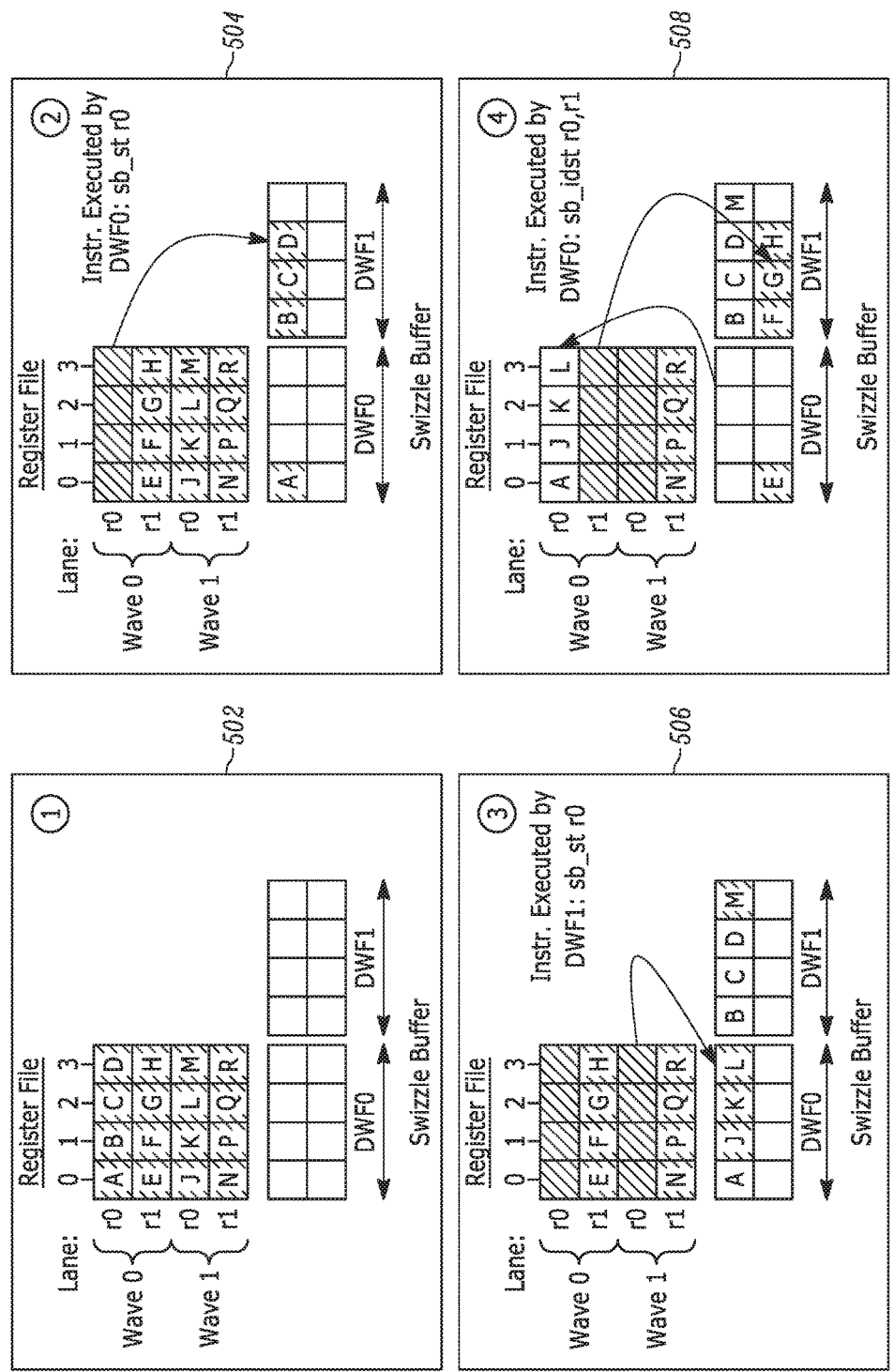
FIG. 5, including FIGS. 5A and 5B, includes diagrams of a wavefront migration process by which register context information is migrated from a wavefront to a dynamic wavefront based on the software thread migration information of FIG. 4.

FIG. 5 includes diagrams of a software thread migration process by which register context information is migrated from one wavefront to another wavefront based on the software thread migration information of FIG. 4. For example, in FIG. 5A, diagram 502 shows a register file, such as register file 228, holding register file content information for wavefront 0 (i.e. Wave 0) and wavefront 1 (i.e. Wave 1). Specifically, the register file is shown as holding register 0 and register 1 information for each of the two wavefronts, where each wavefront is associated with (e.g. executing on) four lanes (e.g. SIMD lanes) including lane 0, lane 1, lane 2, and lane 3. Diagram 502 also shows an empty dynamic thread migration swizzle buffer, such as dynamic thread migration swizzle buffer 202, before the start of a software thread migration. As indicated by the software thread migration information found in first entry 404 of the reconvergence stack for dynamic wavefront 0 (DWF0) 402 and the first entry 410 in the reconvergence stack for dynamic wavefront 1 (DWF1) 408 of FIG. 4, lane 0 of the register file hosts both registers r0 and r1 of software thread with thread ID 0, belonging to DWF0, and software thread with thread ID 4, belonging to DWF1. In addition, lane 1 of the register file hosts software threads with thread IDs 1 and 5, lane 2 hosts software threads with thread IDs 2 and 6; and lane 3 hosts software threads with thread IDs 3 and 7. For simplicity purposes, a software thread with a thread ID of N will be described simply as software thread N below.

In this example, the dynamic thread migration swizzle buffer includes two rows and each row is partitioned between DWF0 and DWF1. Also in this example, at any point in time, one row of the dynamic thread migration swizzle buffer will be a read-only row and the other row will be a write-only row. However, the read-only row and the write-only row may swap access permissions, such that the read-only row is now a write-only row, and the write-only row becomes a read-only row. In this fashion, register context information that is written to a write-only row is accessible to be read out when that same row swaps permissions and becomes a read-only row. Moreover, this allows for a write-row to be written to at the same time that a read-row is read from.

As shown in diagram 504 of FIG. 5A, in response to execution of the "sb_st r0" instruction by DWF0, register r0 content information associated with software thread 0 is spilled to (e.g. written to) DWF0's partition in the dynamic thread migration swizzle buffer, and register r0 content information associated with software threads 1, 2, and 3 is spilled to DWF1's partition in the dynamic thread migration swizzle buffer. As indicated in diagram 506 of FIG. 5A, in response to the execution of the "sb_st r0" instruction by DWF1, register r0 content information associated with software threads 4, 5, and 6 are spilled to DWF0's partition in the dynamic thread migration swizzle buffer, and register r0 content information associated with software thread 7 is spilled to DWF1's partition in the dynamic thread migration swizzle buffer.

Figure 5B:
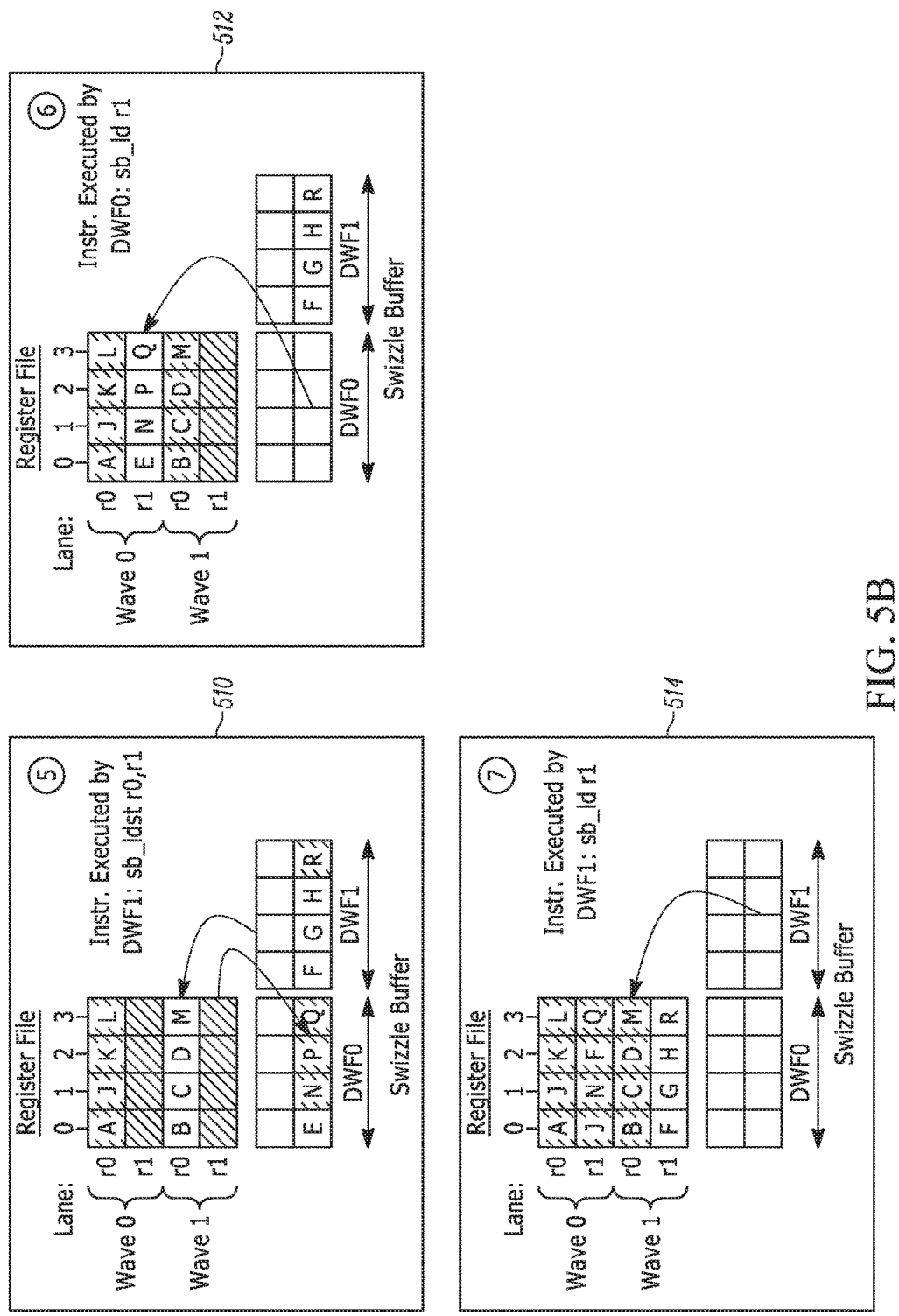

As shown in diagrams 508 of FIG. 5A and 510 of FIG. 5B, the execution of the "sb_ldst r0, r1" instruction by DFW0 causes the spilling of register r1 content information from the register file to the dynamic thread migration swizzle buffer, and the simultaneous loading of register r0 content information from the dynamic thread migration swizzle buffer to the register file (e.g. reading register content from the dynamic thread migration swizzle buffer and writing it to the register file). Specifically, in diagram 508, in response to the execution of the "sb_ldst r0, r1" instruction by DWF0, register r1 content information associated with software thread 0 is spilled to DWF0's partition in the dynamic thread migration swizzle buffer, and register r1 content information associated with software threads 1, 2, and 3 is spilled to DWF1's partition in the dynamic thread migration swizzle buffer. Simultaneously, register content information found in DWF0's partition of the register file is loaded to register r0. Similarly, in diagram 510, in response to the execution of the "sb_ldst r0, r1" instruction by DWF1, register r1 content information associated with software threads 4, 5, and 6 is spilled to DWF0's partition in the dynamic thread migration swizzle buffer, and register r1 content information associated with software thread 7 is spilled to DWF1's partition in the dynamic thread migration swizzle buffer. Simultaneously, register content information found in DWF1's partition of the register file is loaded to register r0.

As shown in diagram 512 of FIG. 5B, in response to the execution of the "sb_ld r1" instruction by DWF0, register content information found in DWF0's partition of the register file is loaded to register r1. Similarly, in diagram 514 of FIG. 5B, in response to the execution of the "sb_ld r1" instruction by DWF1, register content information found in DWF1's partition of the register file is loaded to register r1, thus completing the register context migration process of software threads 1, 2, and 3 from DWF0 to DWF1, and software threads 4, 5, and 6 from DWF1 to DWF0, according to the software thread migration information of FIG. 4.

In some embodiments, the dynamic thread migration swizzle buffer instructions across all wavefronts participating in a software thread migration are executed in lock-step fashion. Such lock-step execution of swizzle buffer instructions across wavefronts may ensure that registers from all participating wavefronts are spilled to partitions within the dynamic thread migration swizzle buffer before repopulating the register file with register context information from those same partitions of the dynamic thread migration swizzle buffer. For example, referring back to FIG. 5, the "sb_st r0" instructions may be executed by wavefronts DFW0 and DFW1 in lock-step fashion. Similarly, the "sb_ldst r0, r1" and "sb_ld r1" instructions may also be executed in lock-step fashion by wavefronts DFW0 and DFW1.

Figure 6:
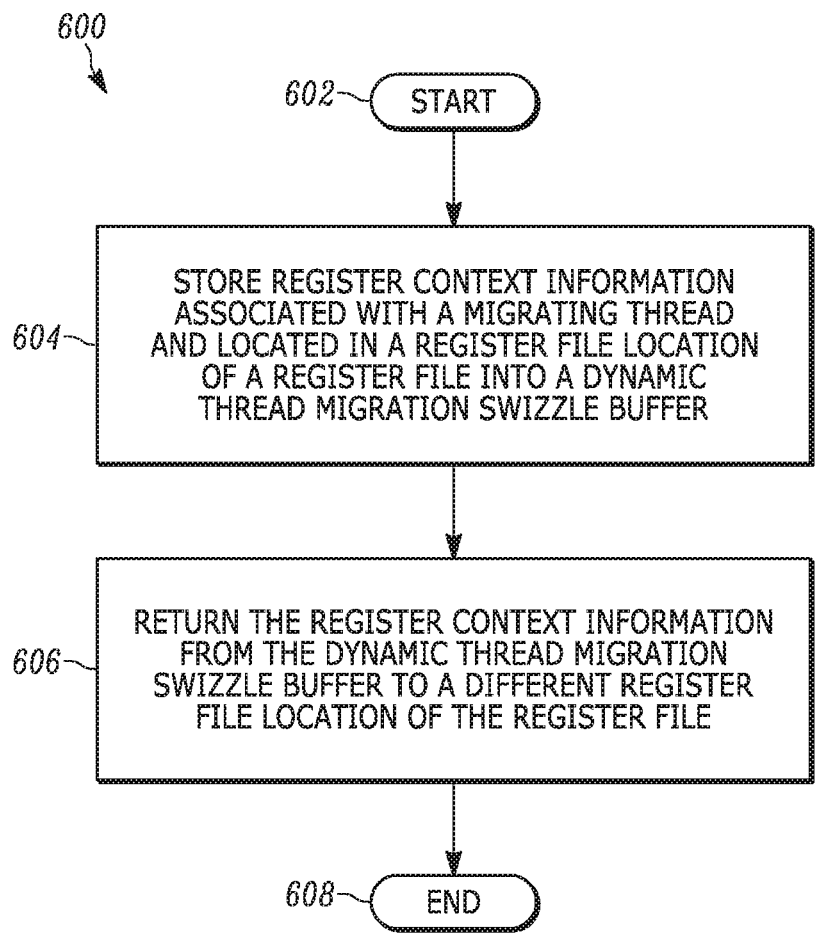
FIG. 6 is a flowchart of an example method for migrating register context information associated with a migrating software thread.

FIG. 6 is a flowchart of an example method for migrating register context information associated with a migrating software thread. The method illustrated in FIG. 4, and each of the example methods described herein, may be carried out by processing device 100. As such, the methods may be carried out by hardware or a combination of hardware and hardware executing software. Suitable hardware may include one or more GPUs, CPUs, APUs, ASICs, state machines, FPGAs, digital signal processors (DSPs), or other suitable hardware. Although the methods are described with reference to the illustrated flowcharts (e.g., in FIG. 4), it will be appreciated that many other ways of performing the acts associated with the methods may be used. For example, the order of some operations may be changed, and some of the operations described may be optional. Additionally, while the methods may be described with reference to the example processing device 100, it will be appreciated that the methods may be implemented by other apparatus as well, and that processing device 100 may implement other methods.

The example flowchart 600 begins at block 604, where register context information, associated with a migrating thread and located in a register file location of a register file, is stored into a dynamic thread migration swizzle buffer, such as dynamic thread migration swizzle buffer 202. For example, the register context information may be read out of one or more register file locations of the register file associated with one wavefront, and stored into a partition of the dynamic thread migration swizzle buffer. The method then continues to block 606, where the register context information is returned from the dynamic thread migration swizzle buffer to a different register file location of the register file. Continuing with the same example, the register context information may be read out of the partition of the dynamic thread migration swizzle buffer and stored in one or more register file locations associated with a different wavefront.

Figure 7:
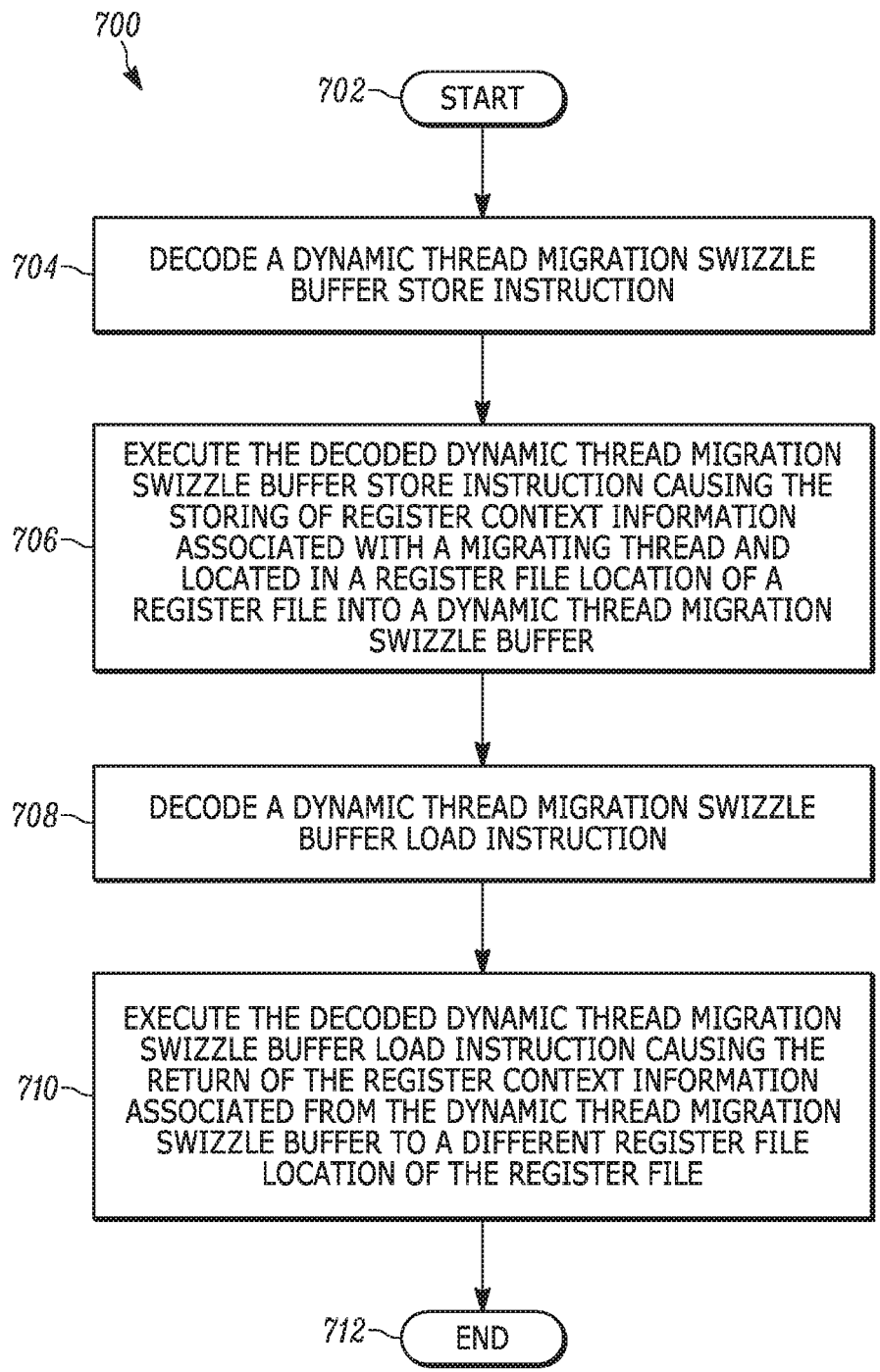
FIG. 7 is a flowchart of another example method for migrating register context information associated with a migrating software thread.

FIG. 7 is a flowchart of another example method for migrating register context information associated with a migrating software thread. The method 700 begins at block 704, where a dynamic thread migration swizzle buffer store instruction is decoded. The method then proceeds to block 706, where the decoded dynamic thread migration swizzle buffer store instruction is executed causing register context information, associated with a migrating thread and located in a register file location of a register file, to be stored into a dynamic thread migration swizzle buffer. The method then proceeds to block 708, where a dynamic thread migration swizzle buffer load instruction is decoded. Proceeding to block 710, the example method executes the decoded dynamic thread migration swizzle buffer load instruction, causing the register context information to be returned from the dynamic thread migration swizzle buffer to a different register file location of the register file. The dynamic thread migration swizzle buffer instructions may be decoded and executed by, for example, a compute unit of processing device 100.

Figure 8:
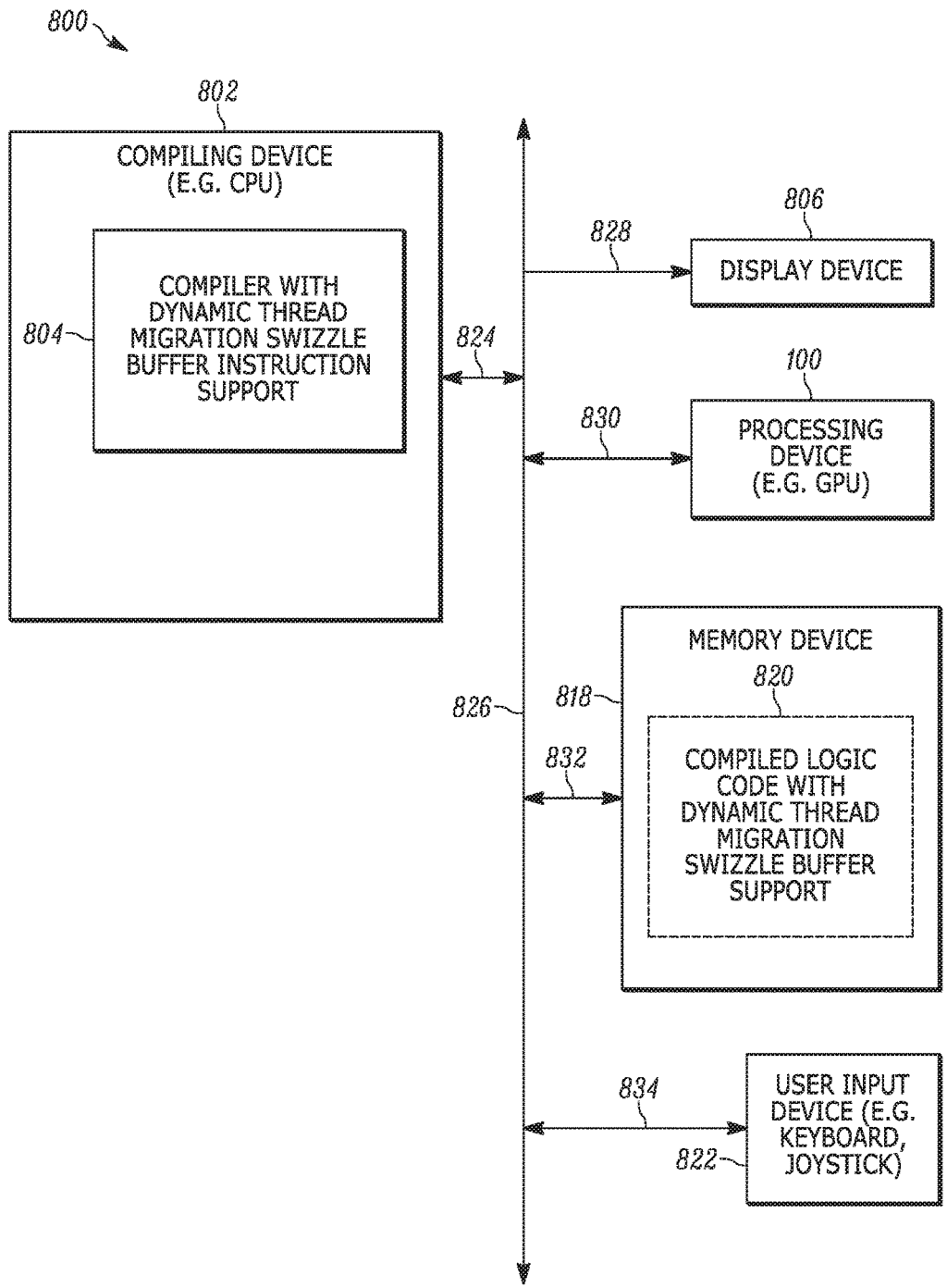
FIG. 8 is a functional block diagram illustrating an example apparatus employing a compiler with dynamic thread migration swizzle buffer instruction support.

FIG. 8 is a functional block diagram illustrating an example apparatus employing a compiler with dynamic thread migration swizzle buffer instruction support and memory storing compiled logic code with dynamic thread migration swizzle buffer support. Apparatus 800 includes compiling device 802, processing device 100, memory device 818, user input device 822, and display device 806, where each of these devices is operatively coupled to expansion bus 826. Expansion bus 826 may be any suitable bus that allows for communications among the various devices. For example, compiling device 802 may communicate with expansion bus 826 over communication link 824. Similarly, processing device 100 may communicate with expansion bus 826 over communication link 830; memory device 818 may communicate with expansion bus 826 over communication link 832; user input device 822 may communicate with expansion bus 826 over communication link 834; and display device 806 may communicate with expansion bus 826 over communication link 828. In one embodiment, expansion bus 826 may be a wireless network that also allows for communication among the various devices.

Compiling device 802, which may be a CPU, includes a compiler with dynamic thread migration swizzle buffer instruction support 804. The compiler with dynamic thread migration swizzle buffer instruction support 804, which may be a cross compiler, a just in time compiler, or any other suitable compiler, may compile code written in higher level software language into lower level code (e.g. compiled software code) as recognized in the art, but also includes support for inserting dynamic thread migration swizzle buffer instructions into the compiled software code. For example, the compiler 804 may insert a dynamic thread migration swizzle buffer store instruction, such that a compute unit, such as compute unit 200, is able to decode and execute the compiled dynamic thread migration swizzle buffer store instruction. Likewise, the compiler with dynamic thread migration swizzle buffer instruction support 804 may support the insertion of a dynamic thread migration swizzle buffer load instruction and a dynamic thread migration swizzle buffer load-store instruction into the compiled software code.

The compiler with dynamic thread migration swizzle buffer instruction support 804 may also be operable to recognize live registers or dead registers at, for example, a branch instruction or a reconvergence point of compiled software. The compiler with dynamic thread migration swizzle buffer instruction support 804 is also operable to insert one or more dynamic thread migration swizzle buffer instructions at a branch or reconvergence point of the compiled software. In one embodiment, the compiler with dynamic thread migration swizzle buffer instruction support 804 inserts one or more dynamic thread migration swizzle buffer instructions at a branch or reconvergence point of the compiled software such as to maintain register context information for live registers, but not for dead registers. For example, to allow for the migration of register context information associated with a migrating software thread, the compiler with dynamic thread migration swizzle buffer instruction support 804 may determine, at a branch instruction of the compiled software, which registers are live and which registers are dead. To migrate register context information for only live registers, the compiler with dynamic thread migration swizzle buffer instruction support 804 may insert into the compiled software one or more sets of a dynamic thread migration swizzle buffer store instruction, a dynamic thread migration swizzle buffer load-store instruction, and a dynamic thread migration swizzle buffer load instruction, just before the branch instruction, as shown, for example, in the software listing of FIG. 3.

The compiler with dynamic thread migration swizzle buffer instruction support 804 may also be operable to determine a microkernel boundary, which is a point in the compiled software (e.g. at a branch instruction) where there is determined to be a minimum number of live registers as compared to another point in the compiled code. For example, as shown in the software listing of FIG. 3, the branch instruction "c_br" may be determined to be a microkernel boundary. By recognizing microkernel boundaries, the compiler with dynamic thread migration swizzle buffer instruction support 804 may reduce the amount of register context information needing to be maintained during a software thread migration. As such, the compiler with dynamic thread migration swizzle buffer instruction support 804 may be operable to insert one or more dynamic thread migration swizzle buffer instructions at a microkernel boundary to migrate register context information for a migrating thread.

In some examples, executable suitable instructions may be stored on a computer readable storage medium, where the executable instructions are executable by one or more processors to cause the one or more processors to perform the actions described herein. Referring back to FIG. 8, memory device 818 may store executable instructions, including compiled logic code with dynamic thread migration swizzle buffer support 820, to be executed by processor 808. For example, the compiled logic code with dynamic thread migration swizzle buffer support 820 may include compiled dynamic thread migration swizzle buffer instructions as compiled by compiling device 802 and described above. Memory device 818 may be any suitable memory, such as random access memory (RAM), non-volatile memory (e.g., read-only memory (ROM), flash memory, EPROM, EEPROM, etc.), a disk storage device, or any other suitable memory that may store executable instructions. Processing device 100 is operatively coupled to memory device 818, for example via expansion bus 826, such that the compiled logic code with dynamic thread migration swizzle buffer support 820 may be obtained for decoding and executing by one or more of its compute units.

The example apparatus 800 may also include one or more of user input device 822 that is operatively coupled to bus expansion 826 to allow a user to provide user input, such as in gaming systems, and a display device 806, which may be any suitable display device. Display device 806 may be operable to receive content to be displayed from processing device 100 over expansion bus 826. For example, the software threads associated with wavefronts executing on processing device 100 may include software threads for gaming applications that require user input, and may include software threads for providing display content to display device 806. As such, gaming systems may benefit from the advantages provided by processing device 100 including the decoding and execution of compiled dynamic thread migration swizzle buffer support instructions.

Some or all of this functionality may also be implemented in any other suitable manner such as, but not limited to, a software implementation including, for example, a driver implementation, a firmware implementation, a hardware implementation, or any suitable combination of the example implementations described above.

Among other advantages, the methods and apparatus allow for the migration of register context information from one column of a register file to another column of a register file, thus allowing the migration of software threads from one execution unit to another execution unit (e.g. from one SIMD lane to another SIMD lane). The methods and apparatus also allow for the migration of register context information without hardware modifications to a register file. In addition, hardware and processing overhead associated with migrating register context information may be reduced. Furthermore, memory resources that may be required to allow for the migration of register context information in current solutions may also be reduced, as the size of the dynamic thread migration swizzle buffer is independent of the number of registers supported by a register file. Persons of ordinary skill in the art would recognize and appreciate further advantages as well.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations, or equivalents that fall within the spirit and scope of the basic underlying principles disclosed above and claimed herein.

What is claimed is:

1. A method carried out by a processing device to migrate a software thread comprising:
   migrating a software thread from a first execution unit to a second execution unit by:
      storing register context information located in a register file location of a register file associated with the first execution unit into a dynamic thread migration swizzle buffer that allows for simultaneous read and write operations;
      returning the register context information from the dynamic thread migration swizzle buffer to a different register file location of the register file associated with the second execution unit;
      wherein the storing of the register context information is in response to an executing a dynamic thread migration swizzle buffer store instruction; and
      the returning of the register context information is in response to executing a dynamic thread migration swizzle buffer load instruction.

2. A method to migrate a software thread comprising:
   storing register context information located in a register file location of a register file into a dynamic thread migration swizzle buffer;
   returning the register context information from the dynamic thread migration swizzle buffer to a different register file location of the register file; and
   wherein:
   the storing of the register context information is in response to executing a dynamic thread migration swizzle buffer store instruction; and
   the returning of the register context information is in response to executing a dynamic thread migration swizzle buffer load instruction.

3. The method of claim 2 wherein:
   the storing of the register context information comprises:
      storing first register context information associated with a first software thread to a first location of the dynamic thread migration swizzle buffer; and
      storing second register context information associated with a second software thread to a second location of the dynamic thread migration swizzle buffer; and
   the returning of the register context information comprises:
      loading the contents from the first location of the dynamic thread migration swizzle buffer to a first register column of the register file; and
      loading the contents from the second location of the dynamic thread migration swizzle buffer swizzle buffer to a second register column of the register file.

4. The method of claim 3 wherein the storing of the second register context information and the loading of the contents from the first location of the dynamic thread migration swizzle buffer are performed simultaneously and in response to executing a dynamic thread migration swizzle buffer load-store instruction.

5. The method of claim 2 further comprising:
   determining to migrate a software thread from a first wavefront executing on a first execution unit to a second wavefront executing on a second execution unit based on software thread migration information.

6. The method of claim 2, comprising:
determining a number of partitions for the dynamic thread migration swizzle buffer based on a number of software threads in a wavefront and a number of wavefronts;
partitioning the dynamic thread migration swizzle buffer into a first partition and a second partition based on the determined number of partitions;
associating a first partition of the dynamic thread migration swizzle buffer with a first wavefront; and
associating a second partition of the dynamic thread migration swizzle buffer with a second wavefront.

7. A method to migrate a software thread comprising:
storing register context information located in a register file location of a register file into a dynamic thread migration swizzle buffer;
returning the register context information from the dynamic thread migration swizzle buffer to a different register file location of the register file;
determining a number of partitions for the dynamic thread migration swizzle buffer based on a number of software threads in a wavefront and a number of wavefronts;
partitioning the dynamic thread migration swizzle buffer into a first partition and a second partition based on the determined number of partitions;
associating a first partition of the dynamic thread migration swizzle buffer with a first wavefront; and
associating a second partition of the dynamic thread migration swizzle buffer with a second wavefront.

8. The processing device of claim 7 wherein:
the storing of the register context information comprises:
storing first register context information associated with a first wavefront to a first location of the dynamic thread migration swizzle buffer; and
storing second register context information associated with a second wavefront to a second location of the dynamic thread migration swizzle buffer; and
the returning of the register context information comprises:
loading the contents from the first location of the dynamic thread migration swizzle buffer to a first register column of the register file; and
loading the contents from the second location of the dynamic thread migration swizzle buffer to a second register column of the register file.

9. The processing device of claim 8 wherein the execution unit comprises:
a decode unit that is operable to decode a dynamic thread migration swizzle buffer load-store instruction; and
an execution stage that is operable to execute a decoded dynamic thread migration swizzle buffer load-store instruction, wherein the execution unit is operable to perform the storing of the second register context information and the loading of the contents from the first location of the dynamic thread migration swizzle buffer simultaneously and in response to an execution of the dynamic thread migration swizzle buffer load-store instruction.

10. The processing device of claim 8 wherein the execution unit comprises:
a decode unit that is operable to:
decode a dynamic thread migration swizzle buffer store instruction; and
decode a dynamic thread migration swizzle buffer load instruction; and
an execution stage that is operable to:
execute a decoded dynamic thread migration swizzle buffer store instruction, wherein the execution unit is operable to perform the storing of the first register context information in response to an execution of a decoded dynamic thread migration swizzle buffer store instruction; and
execute a decoded dynamic thread migration swizzle buffer load instruction, wherein the execution unit is operable to perform the loading of the contents from the second location of the dynamic thread migration swizzle buffer swizzle buffer in response to an execution of a decoded dynamic thread migration swizzle buffer load instruction.

11. The processing device of claim 7 wherein the at least one of the processing cores is operable to determine whether to migrate a software thread from a first wavefront executing on a first execution unit to a second wavefront executing on a second execution unit based on software thread migration information.

12. A processing device comprising a plurality of processing cores wherein at least one of the processing cores comprises:
a dynamic thread migration swizzle buffer;
a register file; and
a plurality of compute units wherein at least one of the plurality of compute units is operably coupled to the dynamic thread migration swizzle buffer and to the register file and comprises an execution unit that is operable to:
store register context information located in a register file location of the register file into the dynamic thread migration swizzle buffer;
return the register context information from the dynamic thread migration swizzle buffer to a different register file location of the register file; and
wherein the execution unit comprises:
a decode unit that is operable to:
decode a dynamic thread migration swizzle buffer store instruction; and
decode a dynamic thread migration swizzle buffer load instruction; and
an execution stage that is operable to:
execute a decoded dynamic thread migration swizzle buffer store instruction, wherein the storing of the register context information is in response to an execution of a decoded dynamic thread migration swizzle buffer store instruction; and
execute a decoded dynamic thread migration swizzle buffer load instruction, wherein the returning of the register context information is in response to an execution of a decoded dynamic thread migration swizzle buffer load instruction.

13. A processing device comprising a plurality of processing cores wherein at least one of the processing cores comprises:
a dynamic thread migration swizzle buffer;
a register file; and
a plurality of compute units wherein at least one of the plurality of compute units is operably coupled to the dynamic thread migration swizzle buffer and to the register file and comprises an execution unit that is operable to:
store register context information located in a register file location of the register file into the dynamic thread migration swizzle buffer;

return the register context information from the dynamic thread migration swizzle buffer to a different register file location of the register file; and wherein the at least one of the processing cores is operable to:

determine a number of partitions for the dynamic thread migration swizzle buffer based on a number of software threads in a wavefront and a number of wavefronts;

partition the dynamic thread migration swizzle buffer into a first partition and a second partition based on the determined size;

associate the first partition of the dynamic thread migration swizzle buffer with a first wavefront; and associate the second partition of the dynamic thread migration swizzle buffer with a second wavefront.

14. An apparatus comprising:
a processing device comprising a plurality of processing cores wherein at least one of the processing cores comprises:
  a dynamic thread migration swizzle buffer;
  a register file; and
  a plurality of compute units wherein at least one of the plurality of compute units is operably coupled to the dynamic thread migration swizzle buffer and to the register file and comprises an execution unit that is operable to:
    store register context information located in a register file location of the register file into the dynamic thread migration swizzle buffer; and
    return the register context information from the dynamic thread migration swizzle buffer to a different register file location of the register file; and
  a processor operable to execute a compiler configured to compile at least one of:
    a dynamic thread migration swizzle buffer store instruction that when executed by the execution unit causes the execution unit to store the register context information into the dynamic thread migration swizzle buffer;
    a dynamic thread migration swizzle buffer load instruction that when executed by the execution unit causes the execution unit to return the register context information from the dynamic thread migration swizzle buffer to the different register file location of the register file; and
  wherein the compiler is configured to determine live and dead registers, and in response to determining the live and dead registers, generates a plurality of compiled dynamic thread migration swizzle buffer instructions comprising at least one of:
    a compiled dynamic thread migration swizzle buffer store instruction;
    a compiled dynamic thread migration swizzle buffer load instruction; and
    a compiled dynamic thread migration swizzle buffer load-store instruction.

15. A method carried out by a processing device to migrate a software thread comprising:
migrating an active software thread from a first execution unit to a second execution unit by:
  storing register context information located in a register file location of a register file associated with the first execution unit into a dynamic thread migration swizzle buffer that allows for simultaneous read and write operations;
  returning the register context information from the dynamic thread migration swizzle buffer to a different register file location of the register file associated with the second execution unit;
the storing of the register context information comprises:
  storing first register context information associated with a first software thread to a first location of the dynamic thread migration swizzle buffer; and
  storing second register context information associated with a second software thread to a second location of the dynamic thread migration swizzle buffer; and
the returning of the register context information comprises:
  loading the contents from the first location of the dynamic thread migration swizzle buffer to a first register column of the register file; and
  loading the contents from the second location of the dynamic thread migration swizzle buffer swizzle buffer to a second register column of the register file.
the storing of the first register context information is in response to executing a dynamic thread migration swizzle buffer store instruction; and
the loading of the contents from the second location of the dynamic thread migration swizzle buffer swizzle buffer is in response to executing a dynamic thread migration swizzle buffer load instruction.

16. An apparatus comprising:
a processing device comprising a plurality of processing cores wherein at least one of the processing cores comprises:
  a dynamic thread migration swizzle buffer that allows for simultaneous read and write operations;
  a register file; and
  a plurality of compute units wherein at least one of the plurality of compute units is operably coupled to the dynamic thread migration swizzle buffer and to the register file and comprises an execution unit that is operable to:
    store register context information located in a register file location of the register file into the dynamic thread migration swizzle buffer; and
    return the register context information from the dynamic thread migration swizzle buffer to a different register file location of the register file associated with a different execution unit; and
  a processor operable to execute a compiler configured to compile at least one of:
    a dynamic thread migration swizzle buffer store instruction that when executed by the execution unit causes the execution unit to store the register context information into the dynamic thread migration swizzle buffer; and
    a dynamic thread migration swizzle buffer load instruction that when executed by the execution unit causes the execution unit to return the register context information from the dynamic thread migration swizzle buffer to the different register file location of the register file;
the storing of the register context information comprises:
  storing first register context information associated with a first software thread to a first location of the dynamic thread migration swizzle buffer when the execution unit executes a first compiled dynamic thread migration swizzle buffer store instruction; and
  storing second register context information associated with a second software thread to a second location of the dynamic thread migration swizzle buffer when the execution unit executes a second compiled dynamic thread migration swizzle buffer store instruction; and the returning of the register context information comprises:
- loading the contents from the first location of the dynamic thread migration swizzle buffer to a first register column of the register file when the execution unit executes a first compiled dynamic thread migration swizzle buffer load instruction; and
- loading the contents from the second location of the dynamic thread migration swizzle buffer swizzle buffer to a second register column of the register file when the execution unit executes a second compiled dynamic thread migration swizzle buffer load instruction.

17. The apparatus of claim 16 wherein the compiler is configured to compile a dynamic thread migration swizzle buffer load-store instruction that when executed by the execution unit causes the execution unit to store the register context information into the dynamic thread migration swizzle buffer and simultaneously return the register context information from the dynamic thread migration swizzle buffer to the different register file location of the register file.

18. The apparatus of claim 16 wherein the storing of the second register context information and the loading of the contents from the first location of the dynamic thread migration swizzle buffer are performed simultaneously and in response to the execution unit executing a compiled dynamic thread migration swizzle buffer load-store instruction.

19. The apparatus of claim 16 wherein the compiler is configured to determine live and dead registers, and in response to determining the live and dead registers, generates a plurality of compiled dynamic thread migration swizzle buffer instructions comprising at least one of:
- a compiled dynamic thread migration swizzle buffer store instruction;
- a compiled dynamic thread migration swizzle buffer load instruction; and
- a compiled dynamic thread migration swizzle buffer load-store instruction.

20. The apparatus of claim 19, wherein the plurality of compiled dynamic thread migration swizzle buffer store instructions operate only on the live registers.

* * * * *